United States Patent Office 3,242,060
Patented Mar. 22, 1966

3,242,060
ELECTROPROTECTION OF REFRACTORIES
Pierre Le Clerc, Paris, France, assignor to Compagnie de Saint-Gobain, Neuilly-sur-Seine, France
No Drawing. Filed Sept. 27, 1961, Ser. No. 141,026
Claims priority, application France, Oct. 3, 1960, 840,124
3 Claims. (Cl. 204—130)

It has already been proposed to use electrolytic phenomena in a bath of molten salt, such as molten silicates or molten glass, to reduce the spontaneous attack which the refractories undergo in contact with the bath. Such refractories are usually composed of a high content of metal oxide.

The complexity of the phenomena has not been recognized. On one hand it has been proposed to polarize the refractory, for example zirconium oxide-magnesia, so as to make it positive with respect to an electrode, for instance graphite, immersed in the bath at some distance from the refractory. On the other hand, it has also been proposed to apply a negative potential on metallic or graphite elements to protect them with respect to another electrode which resists the glass well such as platinum or zirconia. Such contradictions show that the problem has not been solved.

As a result of studies which I have made for the purpose of determining the function played in corrosive problems by oxygen ions, I have succeeded in solving this problem of electrolytic protection of refractories and a brief discussion of the principle involved will lead to a comprehension of the invention. The refractory oxides which are generally used to construct the walls of glass furnaces, or to make up different bodies submerged in the molten material for one reason or another can, according to my discoveries be divided into two groups; a first group in which the electrical conductivity of these oxides, which is essentially ionic, is principally assured by the metallic cation, as is the case for the refractory oxides which comprise a metal located in the first part of the periodical classification of the elements, for instance, magnesium, calcium, and in certain cases, aluminum oxides; and those which by reason of the low mobility of large metallic cations, have a conductivity which is essentially assured by displacement of the oxygen ions, for example in the case of zirconium, thorium, titanium and tin oxides.

I have discovered that the behavior, in apparent contradiction, of certain of these polarized oxides, either positively or negatively, is the result on the one hand of the electrode polarity of the said oxide with respect to the glass bath and on the other hand of the electrode polarity of the second electrode with respect to the glass bath, which combine to generate an electrolytic current in the bath. Thus, when one immerses a zirconia electrode in a glass bath and observes the difference of potential evidence in an exterior circuit, in comparison with platinum, one observes that the difference in potential is zero or very small, but if the same observation is made with a comparative electrode in alumina, the zirconia is negative with respect to the alumina; one has thus constituted a pile in which current flows through an exterior circuit from the alumina to the zirconia and which on the inside of the bath travels from the zirconia to the alumina. Now, if under the same conditions one substitutes magnesia for the alumina electrode the polarities are reversed and the current in the glass flows from the magnesia toward the zirconia. Thus in the first case, that of the alumina and zirconia electrodes, the cations, which are essentially the carriers of current in the bath, flow toward the alumina, while in the second case they flow toward the zirconia. The particular role which is thus played by the zirconia is ascribed to its electrode polarity which is practically zero with respect to the alkali silicate glasses which are usually employed in glassmaking.

A difference arises however if the nature of the bath is notably different, for example if it is composed of boric glass or of phosphate glass.

In accordance with what has been said hereinabove one must have constantly in mind the combination of the current which will naturally flow in the absence of external power and the additional current which can be imposed upon the circuit from an exterior source. One must not lose sight of the electromotive forces which are spontaneously generated because of the presence in the circuit of two electrodes of different nature, which are always small and on the order of a volt. On the other hand, even by connecting the circuit to the poles of a D.C. generator capable of establishing a substantial difference in potential, it follows that, because of the potential drop resulting from the low conductivity of the substance in the circuit, the potential difference effectively applied to the interface of the refractory and the glass bath will be on the order of the electromotive force which pre-existed in the circuit. It is therefore insufficient to say that one brings the piece to be protected to a potential, for example negative, if one does not indicate at the same time the value of the potential and the nature of the electrode placed in opposition. In the absence of these specifications, one can only obtain contradictory results.

It is a part of the discovery of this invention that refractory pieces will be electrically protected or not, as the case may be, according to the nature of the electrode with which it is put in circuit, and that under those circumstances the potential used may be either positive or negative. Ignorance of this principle has led to errors of interpretation and failure of result. For example, if the existence of an anionic layer is favorable to the protection of certain refractories, it is not true for other refractories. A block of zirconia is scarcely attacked at all by a bath of silicate if it is sheathed in silica, but if it is carried to a positive potential too high with respect to that of the bath it corrodes because of the ionization of the zirconium oxide and the passage of zirconium ions ($Zr^{4+}$) into the bath. Thus the block of zirconia is electro-protected if it is subjected to a moderate negative potential with respect to an iron electrode or a graphite one, the electromotive force thus applied acting only to oppose the natural electromotive force of the pile constituted by the zirconia, the silicate bath, and the iron (or graphite) in which the zirconia is positive. Now if the electromotive force applied to the exterior was higher there would be increased corrosion of the zirconia.

It is certain that the curve which represents the corrosion of refractory as a function of the potential which is applied to it, cannot be uniform because of the different potentials of discharge of the different ions involved and also by reason of the secondary effects of corrosion which are due to the discharge of gaseous ions. In many cases the application of excessive electromotive forces results in producing increased corrosion rather than protection. It follows that in most cases the potential difference applied to the interface of the refractory with the bath may be reduced with profit.

It is difficult to determine the value of that potential difference from measurement of potential made outside the bath because of the different resistances and electromotive forces existing in other parts of the circuit of which the values change according to the shape, the temperature and the nature of the materials constituting the circuit, and according to the electrode employed in opposition. This is why I have been led to determine the conditions requisite to electroprotection not only by the values of the electromotive force applied to the outside of the circuit but by the direction and the value of the electroprotective current itself. After having studied these phenomena of corrosion, particularly in the case of zirconia in a molten silicate bath, I have determined, as hereinafter explained, these conditions which will produce electroprotection of refractories.

It is an object of the invention to overcome the imperfections of the prior art and to electrolytically protect refractory materials containing metal oxides from hot molten silicates.

The process of the invention consists, thus, in its preferred form, of protecting refractory objects having a zirconia base, that is, being of substantial zirconia content, from a bath containing fused silicate, such as metal salts and glasses, by placing in the molten silicate at least one electrode which is highly resistant to attack by the bath and is a good conductor of electricity, and by disposing another metallic conductor in contact with the piece to be protected, flowing from the electrodes to the conductors a direct current of protective magnitude.

In practice platinum, molybdenum, and stainless steel electrodes are among the useful. They are connected to the positive pole of a generator and the flow of current is from them to the electrode mounted in the zirconia-containing block, which is connected to the negative pole of the generator.

The following examples illustrate the best form of the invention:

*Example 1*

A block of zirconia, electrically melted, is placed in a bath of sodium metasilicate at the temperature of 1200° C. In the block is a cavity filled with platinum powder which is connected to the negative pole of a D.C. generator. A platinum electrode is connected to the other pole of the generator and submerged in the bath at some distance from the block. The electrolytic current flows from the platinum electrode connected to the positive pole to the platinum powder electrode connected to the negative pole. The electrolytic current is maintained constant at a value of 16 ma./cm.$^2$. The speed of corrosion is zero.

*Example 2*

Using the same apparatus of Example 1 under the same conditions, but with the poles reversed so that the current flowed from the block toward the submerged electrode the speed of corrosion of the block was 10 mg./cm.$^2$/h.

*Example 3*

The generator was turned off and the electrodes were disconnected. The speed of corrosion was 3 mg./cm.$^2$/h.

It is apparent from the foregoing statement of principle and illustrative examples that when electrodes are chosen they should be chosen to establish what is in effect a battery in which the current flows from the isolated electrode to the electrode mounted in the block which is to be protected and when an exterior source of power is to be used it must be so directed as to establish a flow toward the refractory.

This invention is applicable to other types of refractory blocks, for instance to zirconia of which the anomaly of expansion has been attenuated or suppressed by a convenient addition of calcium or magnesium oxide, for example, as it is known in industrial practice.

*Example 4*

A sheath of fritted commercial zirconia is provided interiorly with platinum powder in which a conductor made also of platinum, is introduced. This sheath is immersed in soda metasilicate maintained at a temperature of 1270° C. in a platinum crucible.

A potential difference is established between the platinum crucible and the inner conductor of the zirconia electrode which is connected to the negative pole. The potential difference is regulated in such a manner that the current density is 8 ma./cm.$^2$ on the immersed surface of the electrode.

The duration of the trial was fixed to 20 hours. I observed between the beginning and the end of this trial a loss of weight of 46 mg./cm.$^2$ of the immersed surface of the electrode.

If the current density was only 7 ma./cm.$^2$ the loss of weight would be 80 mg./cm.$^2$ of the immersed surface of the electrode.

The corrosion trial effectuated without the application of a potential difference according to the preceding conditions, would lead to a much greater loss of weight. This loss of weight would have been of 500 mg./cm.$^2$ of the immersed surface of the electrode.

The composition of the commercial zirconia in this trial was: zirconia 85%, silica 8%; alumina 7%.

As many apparently widely different embodiments of the present invention may be made without departing from the spirit and scope thereof, it is to be understood that the invention is not limited to the specific embodiments.

What is claimed is:

1. The method of protecting from corrosion a zirconia-based refractory element which is in contact with a bath of molten silicate comprising, immersing an electrode which is resistant to attack by said molten silicate in said bath, connecting a conductor to said refractory element, applying direct current electric power between the electrode and said conductor to create a potential on the refractory element which is negative with respect to the electrode and the bath.

2. The method of claim 1 in which the bath is molten sodium metasilicate, and the electrode is made of metal from the group consisting of platinum, molybdenum and stainless steel.

3. The method of claim 2 in which the bath is at a temperature of about 1200° C., in which the conductor in the refractory element is platinum powder, in which the electrode is platinum and in which the electric power is applied to maintain a substantially constant current density of about 16 ma./cm.$^2$ on the surface of the refractory element in contact with said bath.

References Cited by the Examiner

UNITED STATES PATENTS 2,561,818   7/1951   Peyches _____ 204—130

FOREIGN PATENTS 1,014,292   8/1957   Germany.

OTHER REFERENCES

Ihara et al.: Yogyo Kyokai Shi, 67: 21–7 (1959), Chem. Abstr. 53, 11957i.

Le Clerc: Chimie & Industrie, 69, 653–7 (1953), Chem. Abstr. 47, 11681b.

JOHN H. MACK, *Primary Examiner.*

MURRAY A. TILLMAN, WINSTON A. DOUGLAS,
*Examiners.*